US011271883B2

(12) United States Patent
Sachtjen et al.

(10) Patent No.: US 11,271,883 B2
(45) Date of Patent: Mar. 8, 2022

(54) SYSTEM AND METHOD FOR SECURELY PERFORMING MULTIPLE STAGE EMAIL PROCESSING WITH EMBEDDED CODES

(71) Applicant: Iconix, Inc., San Jose, CA (US)

(72) Inventors: Scott A. Sachtjen, San Jose, CA (US); John Hopple, Yucaipa, CA (US)

(73) Assignee: Iconix, Inc., San Jose, CA (US)

( * ) Notice: Subject to any disclaimer, the term of this patent is extended or adjusted under 35 U.S.C. 154(b) by 0 days.

(21) Appl. No.: 16/987,862

(22) Filed: Aug. 7, 2020

(65) Prior Publication Data

US 2021/0194840 A1 Jun. 24, 2021

Related U.S. Application Data

(63) Continuation of application No. 15/076,814, filed on Mar. 22, 2016, now Pat. No. 10,771,418, which is a continuation of application No. 12/052,563, filed on Mar. 20, 2008, now Pat. No. 9,325,528.

(51) Int. Cl.

| H04L 12/58 | (2006.01) |
| H04W 12/06 | (2021.01) |
| H04W 12/069 | (2021.01) |
| H04L 29/06 | (2006.01) |
| G06Q 10/10 | (2012.01) |
| H04L 51/00 | (2022.01) |

(Continued)

(52) U.S. Cl.

CPC .............. *H04L 51/12* (2013.01); *H04L 51/04* (2013.01); *H04W 12/06* (2013.01); *H04W 12/069* (2021.01); *G06Q 10/107* (2013.01); *H04L 51/00* (2013.01); *H04L 51/28* (2013.01); *H04L 63/08* (2013.01)

(58) Field of Classification Search

CPC ......... H04L 12/58; H04L 63/08; H04L 51/12; H04L 12/585; H04L 51/28; G06Q 10/107

See application file for complete search history.

(56) References Cited

U.S. PATENT DOCUMENTS

| 6,057,841 A | 5/2000 | Thurlow et al. |
| 6,327,611 B1 | 12/2001 | Everingham |
| 6,549,950 B2 | 4/2003 | Lytle |

(Continued)

OTHER PUBLICATIONS

Gabrielson, Erik, et al., "Is the open rate a useful e-mail metric?", DMNEWS, www.dmnews.com, (Sep. 15, 2008), p. 11.

*Primary Examiner* — Philip J Chea
*Assistant Examiner* — Mohammed Ahmed
(74) *Attorney, Agent, or Firm* — Schwegman Lundberg & Woessner, P.A.

(57) ABSTRACT

A system and method for performing email processing at multiple stages along an email delivery chain. A first embodiment uses an email filter to receive information about an email message from a message transfer agent and then perform limited email pre-processing on the email message. The email filter then stores instructions and data such as the results from the email pre-processing into an internet email header added to the email message. The instructions and data placed into the email header may be encrypted for privacy and security. A later email program may extract the instructions and data from the internet email header and continue the email processing. One disclosed application of the multi-stage email processing system is email authentication.

18 Claims, 6 Drawing Sheets

(51) Int. Cl.
*H04L 51/04* (2022.01)
*H04L 51/48* (2022.01)

(56) References Cited

U.S. PATENT DOCUMENTS

| | | |
|---|---|---|
| 6,782,414 B1 | 8/2004 | Xue et al. |
| 9,325,528 B2 | 4/2016 | Sachtjen et al. |
| 10,771,418 B2 | 9/2020 | Sachtjen et al. |
| 2002/0016818 A1 | 2/2002 | Kirani |
| 2003/0050988 A1 | 3/2003 | Kucherawy |
| 2004/0039786 A1 | 2/2004 | Horvitz et al. |
| 2004/0064511 A1 | 4/2004 | Abdel-Aziz et al. |
| 2004/0068542 A1 | 4/2004 | Lalonde et al. |
| 2004/0196968 A1 | 10/2004 | Yue |
| 2004/0215721 A1 | 10/2004 | Szeto et al. |
| 2004/0243847 A1 | 12/2004 | Way |
| 2005/0010644 A1 | 1/2005 | Brown et al. |
| 2005/0015457 A1 | 1/2005 | Warasawa |
| 2005/0108335 A1* | 5/2005 | Naick ............ H04L 51/08 709/206 |
| 2005/0223226 A1 | 10/2005 | Sundararajan |
| 2006/0143277 A1 | 6/2006 | Bauchot et al. |
| 2006/0168057 A1* | 7/2006 | Warren ............ H04L 51/12 709/206 |
| 2006/0200530 A1* | 9/2006 | Tokuda ............ G06F 3/04842 709/206 |
| 2007/0005702 A1 | 1/2007 | Tokuda et al. |
| 2007/0005716 A1 | 1/2007 | Levasseur et al. |
| 2007/0061401 A1 | 3/2007 | Bodin et al. |
| 2007/0083602 A1* | 4/2007 | Heggenhougen ..... H04L 51/063 709/206 |
| 2007/0130464 A1 | 6/2007 | Swedor et al. |
| 2007/0143407 A1 | 6/2007 | Avritch et al. |
| 2007/0233789 A1 | 10/2007 | Agarwal et al. |
| 2007/0233790 A1 | 10/2007 | Agarwal et al. |
| 2008/0005247 A9* | 1/2008 | Khoo .................. H04L 51/046 709/206 |
| 2008/0098237 A1 | 4/2008 | Dung et al. |
| 2008/0114881 A1 | 5/2008 | Lee et al. |
| 2008/0133669 A1 | 6/2008 | Ge et al. |
| 2008/0141346 A1* | 6/2008 | Kay ..................... H04L 51/00 726/4 |
| 2008/0155035 A1 | 6/2008 | Reddy et al. |
| 2008/0163345 A1 | 7/2008 | Bauman et al. |
| 2008/0189770 A1 | 8/2008 | Sachtjen |
| 2008/0270545 A1 | 10/2008 | Howe |
| 2009/0019003 A1 | 1/2009 | Bohannon et al. |
| 2009/0094335 A1 | 4/2009 | Edmonds et al. |
| 2009/0106840 A1 | 4/2009 | Dreymann et al. |
| 2009/0138711 A1* | 5/2009 | Heimbigner ......... H04L 51/12 713/170 |
| 2009/0240774 A1 | 9/2009 | Sachtjen et al. |
| 2013/0080554 A1 | 3/2013 | Addante |
| 2016/0277336 A1 | 9/2016 | Sachtjen et al. |

\* cited by examiner

SYSTEM AND METHOD FOR SECURELY PERFORMING MULTIPLE STAGE EMAIL PROCESSING WITH EMBEDDED CODES

RELATED APPLICATIONS

The present application is a continuation of and claims priority to U.S. application Ser. No. 15/076,814, entitled: "System And Method For Securely Performing Multiple Stage Email Processing With Embedded Codes" filed Mar. 22, 2016, which is continuation of and claims priority to U.S. application Ser. No. 12/052,563 entitled: "System and method for Securely Performing Multiple Stage Email Processing with Embedded Codes," filed on Mar. 20, 2008, now issued on Apr. 26, 2016 as U.S. Pat. No. 9,325,528; the disclosure of which are incorporated in their entirety herein and below.

TECHNICAL FIELD

The present invention relates to the computer communication. In particular, but not by way of limitation, the present invention discloses techniques for processing email messages at multiple stages during the journey of an email message.

BACKGROUND

The global internet has become a mass media on par with radio and television. As a mass media, it has become an invaluable tool for companies wishing to advertise and directly communicate with customers. One of the simplest features of the global Internet, electronic mail, is also one of its most powerful tools. With electronic mail (email), a user of the Internet can send a message to any other user on the internet. With the advent of HTML formatted email messages, email can now contain images and hyperlinks to other resources. Additional files, such as programs or data, can also be enclosed within email. Thus, even though email is one of the oldest internet applications, it remains one of the most important.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to email systems that use the Simple Mail Transport Protocol (SMTP), the teachings can be used with other types of email protocols or other types of electronic communication systems. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
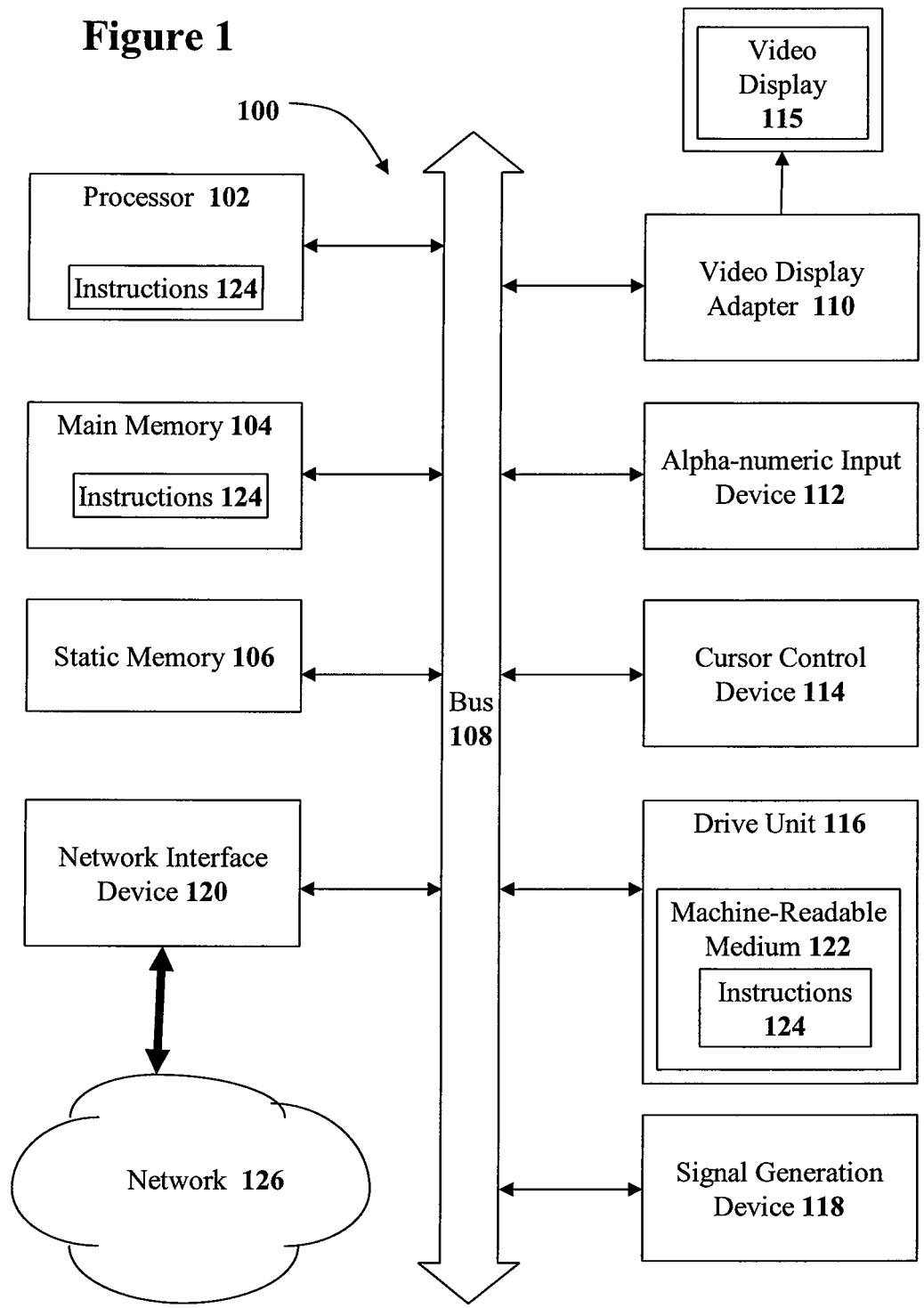
FIG. 1 illustrates a diagrammatic representation of machine in the example form of a computer system within which a set of instructions, for causing the machine to perform any one or more of the methodologies discussed herein, may be executed.

FIG. 1 illustrates a diagrammatic representation of a machine in the example form of a computer system 100 within which a set of instructions 124, for causing the machine to perform any one or more of the methodologies discussed herein, may be executed. In alternative embodiments, the machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network server, a network router, a network switch, a network bridge, or any machine capable of executing a set of instructions (sequential or otherwise) that specify actions to be taken by that machine. Further, while only a single machine is illustrated in FIG. 1, the term "machine" shall also be taken to include any collection of machines that individually or jointly execute a set (or multiple sets) of instructions to perform any one or more of the methodologies discussed herein.

The example computer system 100 illustrated in FIG. 1 includes a processor 102 (e.g., a central processing unit (CPU), a graphics processing unit (GPU) or both), a main memory 104, a static memory 106, which may communicate with each other via a bus 108. The computer system 100 may further include a video display adapter 110 that drives a video display system 115 such as a Liquid Crystal Display (LCD) or a Cathode Ray Tube (CRT). The example computer system 100 also includes an alphanumeric input device 112 (e.g., a keyboard), a cursor control device 114 (e.g., a mouse or trackball), a disk drive unit 116, a signal generation device 118 (e.g., a speaker), and a network interface device 120. Note that various embodiments of a computer system will not always include all of these peripheral devices.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 for operating computer system 100 may be transmitted or received over a network 126 via the network interface device 120 utilizing any one of a number of well-known transfer protocols such as the File Transfer Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, flash memory, magnetic media, and carrier wave signals.

For the purposes of this specification, the term "module" includes an identifiable portion of computer code, computational or executable instructions, data, or computational object to achieve a particular function, operation, processing, or procedure. A module need not be implemented in software; a module may be implemented in software, hardware/circuitry, or a combination of software and hardware.

Internet Email Transport

Although individual computer systems are powerful tools on their own, the usefulness of computer systems is greatly enhanced when the computer systems are coupled together into computer networks. When computers are coupled together into computer networks, the computer systems can share data and network accessible resources such as printers, scanners, and storage space. Individual local computer networks have been coupled together to create a global interconnection of computer networks known as the internet.

One of the simplest and most useful applications of the global internet is electronic mail known simply as "email." Email allows a user with a computer system coupled to the internet to send a message (known as an email) to one or more other users that have email accounts on computer systems coupled to the internet.

Figure 2A:
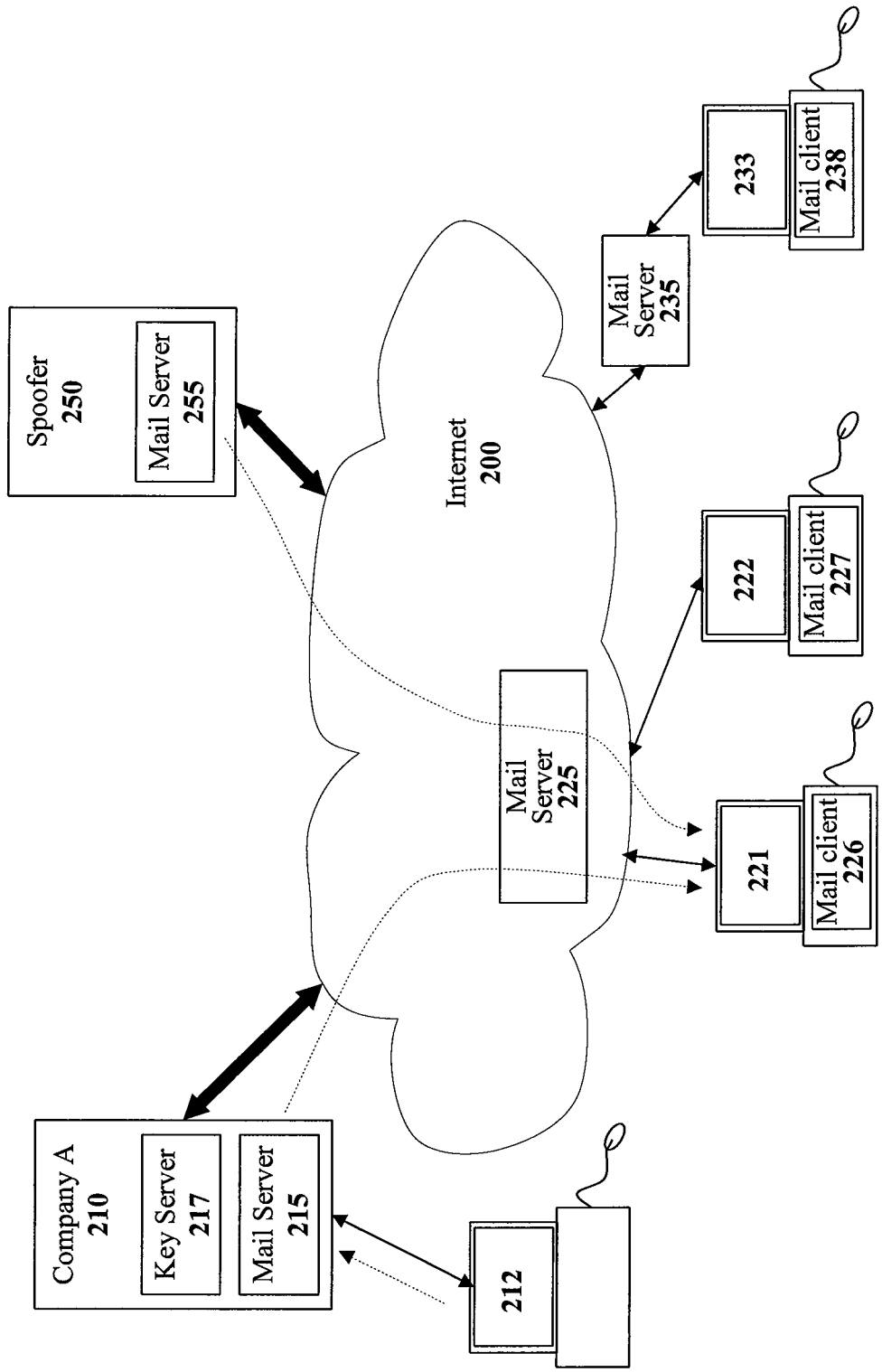
FIG. 2A illustrates a block diagram that conceptually depicts an example use of internet-based email.

FIG. 2A illustrates an example use of internet based email. Referring to FIG. 2A, an employee of Company A at computer system 212 may use a mail client 216 on computer system 212 to compose an email message to send to one or more other internet users such as the user of computer systems 221. When the employee of Company A at computer system 212 completes the drafting of an email message addressed to the user of computer systems 221 and sends that email message, the email message is first transported to Company A's local mail server 215 that handles email for that user.

All internet-based email messages (SMTP messages) have two major sections: message headers and a message body. The message body contains the content of the message and targeted to the recipient of the email. The message headers used by the applications that handle the creation, routing, transport, and final delivery of email messages. The format of internet email headers is fully disclosed in the Internet Engineering Task Force (IETF) Request for Comments (RFC) document 2822. Although the specifics of other email systems vary, virtually all email systems support the same construct of having a message header section and a message body section.

Continuing with the example message transit of FIG. 2A, mail server 215 parses the header information in the email message to determine where to send the email message. After parsing the internet email headers, mail server 215 then delivers the email message to email server 225 used by the intended recipient at computer system 221. In the example of FIG. 2A, computer system 221 uses a mail server provided by his local Internet Service Provider (ISP) such that email server 225 appears to be part of the Internet from the perspective of computer system 221.

Finally, the user of computer system 221 may access his local mail server 225 with local mail client program 226 to retrieve the email message from Company A. The local mail client program 226 on computer system 221 may download the email message from mail server 225 and create a local copy of the email message. Alternatively, mail server 225 may be a web-based email server that allows the user of computer system 221 to access email on mail server 225 using a standard web browser as a local email client program on the local computer system 221. Since the local mail client program 226 resides on the end user's personal computer system 221, it would desirable to not require frequent updates to the local mail client program 226 since this requires that all the individual personal computer system users to individually update the software that resides on their personal computer system which can be a difficult and expensive task.

Internet Email Processing

As set forth in the previous example, the main task involved in processing internet email messages is to receive, route, and deliver the email messages to intended final destination of the email messages. However, many additional types of email processing tasks have become popular in recent years, largely due to the abuse of the extremely useful internet email system by unscrupulous people. One very popular type of email processing is the filtering of unsolicited commercial email (UCE) messages more commonly known as "spam". In addition to spam filtering, computer virus scanning has also become a very popular email processing task since computer viruses are often transmitted within documents enclosed in an email message. Email authentication, the task of verifying that a particular email message is actually from the person listed as the sender of the email message, is yet another email processing task that is increasingly being demanded due the amount of fraud committed using internet email in recent years.

These newer email processing tasks may be performed at various stages along the transmission of an internet email messages. There are advantages and disadvantages of performing these email processing tasks at the various different stages. For example, it is advantageous to perform email authentication within the email client program used by an email recipient since there will then be no intermediary that could modify the message after the email message has been authenticated. However, performing email processing tasks in an end user's email client program can be disadvantageous for a number of reasons. For example, an end user may have very limited computer system that cannot perform difficult or large processing tasks, the end user may not properly maintain his computer system, it is difficult to install updates in a large number of end user systems, and there may be many different types of end user systems that need to be supported. Thus, one may wish to avoid performing email processing tasks in an end user system.

Multi-Stage Email Processing

Since it can be difficult to perform email processing tasks in an end user's computer system, the present disclosure introduces a multi-stage email processing system. The multi-stage email processing system allows an email processing task to be divided and then performed at various different stages along an email delivery chain. One important feature of the multi-stage email processing system is an additional email message component that is added to email messages handled by the multi-stage email processing system that can contain instructions and data. The added email message component may comprise a new email message header added to the message. The instructions and data contained within the header allow machine executable code and data for processing to be passed along to various processing entities in the multi-stage email processing system.

To best disclose the multi-stage email processing system, an example application of the multi-stage email processing system will be presented using the email processing task of email authentication. This particular email processing task shows how aspects of an email processing task best performed by an end client system can be moved forward in the email processing chain thus simplifying the tasks to be performed in the end client system. However, email authentication is only one of many different types of email processing tasks that can be handled using the disclosed multi-stage email processing system.

Internet Email Authentication

As the internet has grown in prominence as an important communication medium, the internet has also become a new medium to be exploited by criminals and other unscrupulous individuals. Identity theft and fraud have become all too common on the internet. Such crimes have become popular since internet crime can be performed in any country that has internet access, it is very easy to use a false internet address, and the anonymity of the internet allows most perpetrators to avoid capture and prosecution.

One method of protecting against internet crimes such as identity theft and fraud is to authenticate the identity of an email message sender. Authentication helps verify that the sender of the email message actually is the person that the sender claims to be. If one cannot authenticate the identity of an email message sender, then the recipient of the email message should be extra cautious when considering that email message (or perhaps just disregard the email message) since that email message may have been sent by a person attempting to misrepresent himself as person listed as the email message sender. If one can normally authenticate messages from that particular email sender then the email message recipient should probably just discard all the email messages that purport to be from that particular email sender but cannot be authenticated. Such an attempt of misrepresenting oneself on the internet is commonly known as "spoofing".

For example, referring back to the example FIG. 2A, a spoofer 250 that wishes to misrepresent himself as being from Company A may also send an email message to the user of computer system 221. In one method of spoofing, Spoofer 250 may attempt to misrepresent himself by changing the "From:" field of the email message. The message will be transported from the spoofer's email server 255 to the email server 225 used by the intended recipient at computer system 221. The user of computer system 221 may access mail server 225 with mail client program 226 to retrieve the email message from Spoofer 250 that purports to be from Company A. Without any additional help, an unsophisticated user at computer system 221 will not know if any particular email message received is authentic or not.

To help users differentiate between authentic messages and spoofed messages, email systems may use various email authentication systems. Email authentication may be performed using the different authentication systems set forth in IETF RFC 4406, 4408, and 4871, or using any other similar techniques. For example, with the Domain Keys Identified Mail (DKIM) Signatures system for email authentication as set forth in RFC 4871, an email message may be cryptographically signed using a private key associated with the domain of the email message sender. The domain of an email message sender is generally the portion to the right of the "@" symbol in an email message. For example, in the email address "Joe@Iconix.com", the "Iconix.com" portion identifies the email sender's domain. Message recipients can verify the cryptographic signature by querying the email sender's domain directly to retrieve the appropriate public key associated with that domain. Then, the cryptographic signature is decrypted with that public key to verify if the message was actually send from that email domain.

Figure 2B:
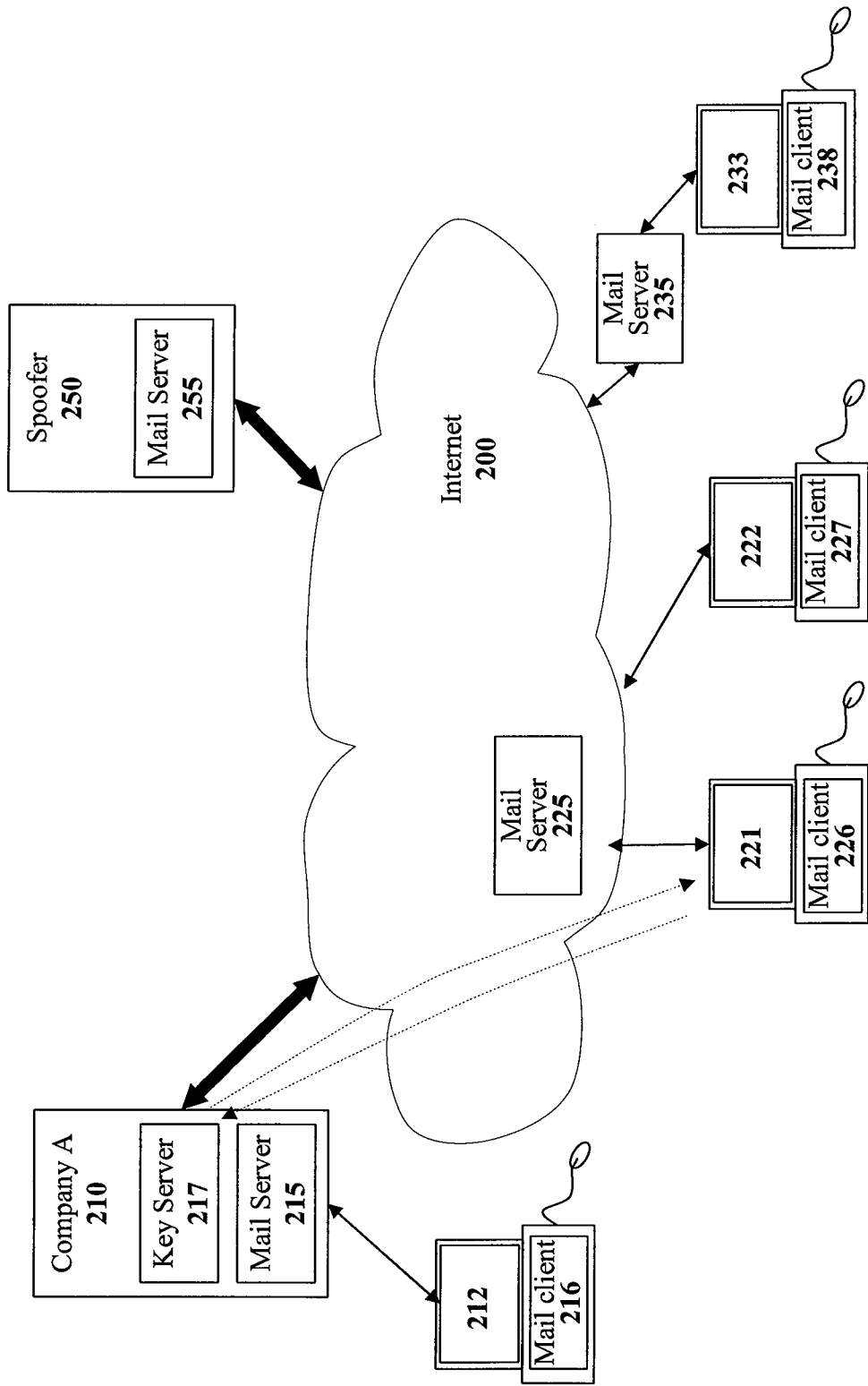
FIG. 2B illustrates the internet email scenario of FIG. 2A wherein a mail client program performs authentication on an email message using a key server to determine the authenticity of an email message.

Referring back to the example of FIG. 2A, to authenticate a digitally signed message purportedly sent from Company A, mail client program 226 should attempt to decrypt the cryptographic signature. This is illustrated in FIG. 2B wherein mail client program 226 requests the public key associated with the domain of Company A from key server 217 within company A's domain. Upon receiving Company A's public key from key server 217, mail client program 226 may attempt to decrypt the cryptographic signature. If the cryptographic signature decrypts properly (as will occur with a real message from Company A containing a real cryptographic signature from Company A's domain) then mail client program 226 may mark the email as authentic. If the cryptographic signature does not decrypt properly or there is no cryptographic signature (as will be the case for an email message sent from spoofer 250), then mail client program 226 may mark the email message as suspicious and likely to be from a forged email address.

The email authentication system illustrated with reference to FIGS. 2A and 2B is a very effective email authentication system. However, the email authentication system of FIGS. 2A and 2B does have some downsides. One downside is that the email authentication system of FIGS. 2A and 2B requires a specialized mail client program within the end user's computer system to perform the email authentication. As previously set forth, there are number of downsides to processing email messages in end user computer systems.

One difficultly is that such an end user based email authentication system may not be easy to integrate with the very popular web server based email systems such as Yahoo! Email service, Microsoft's Hotmail service, and Google's gmail service. These web server based email services are designed for use with any standard World Wide Web browser program such as Microsoft's Internet Explorer, Mozilla's Firefox, and Apple Computer's Safari. Thus, these web-based email systems are not designed for email processing by the end user's email client. Furthermore, thin client devices such as cellular telephones and television set-top boxes may not be easy to upgrade with a full new email client or an add-on email authentication program. Even if one can easily have a full mail client program in every end user computer system, the cost and difficulty of deploying an upgraded email client program with email authentication capabilities to each and every end user computer system can be difficult and expensive.

Upstream Email Pre-Processing with Mail Server Based Add-Ons

To fully perform or at least reduce the work that must be performed by an end user's mail client program for email authentication, the present disclosure proposes using the multi-stage email processing system for performing email authentication. Specifically, the multi-stage email processing system can perform full email authentication or some email authentication pre-processing within a message transfer agent (MTA) such that the processing workload for the end user system can be reduced.

In one embodiment, the multi-stage email processing system performs upstream email message processing using a mail filter program that interacts with a mail transfer agent (MTA). By using a mail filter program to perform some email processing for an email processing task traditionally handled by an end user mail client program, the processing requirements of the end user mail client program can be reduced. This is advantageous for thin-client email clients such as cellular telephones and web-based email systems that use web browsers as an email client. Ideally, the workload of the end email client system can be so reduced that any remaining processing can be performed by a JavaScript, a Java application, or some other very lightweight processing environment.

The usage of a mail filter for multi-stage email processing system contrasts with prior mail filter usage since prior mail filters were completely self-contained applications. The presently disclosed system proposes using mail filters as just part of a multi-stage email processing system.

Mail Filters

A mail filter program is a program that receives information about email messages from a Message Transfer Agent (MTA) and may instruct the MTA to reject, discard, or alter the email messages. Mail filters have been named "milters" using a shorted version of mail filters. Milters can process an email message's connection (IP) information, envelope protocol elements, message headers, and/or message body contents, and modify an email message's recipients, headers, and body. The original purpose for creating milters was to perform filtering of unwanted commercial email (UCE) more commonly known as "spam" and to perform filtering of email messages or email attachments that may contain malicious programs (commonly known as malware) such as a computer viruses, spyware, and adware.

Sendmail and Postfix are very well-known Message Transfer Agent (MTA) programs that handle a very large percentage of all the email messages that travel on the global internet. Both Sendmail and Postfix provide for an interface with milter programs using a standard milter interface. The standard milter interface is implemented as a milter library, known as libmilter.

Figure 3:
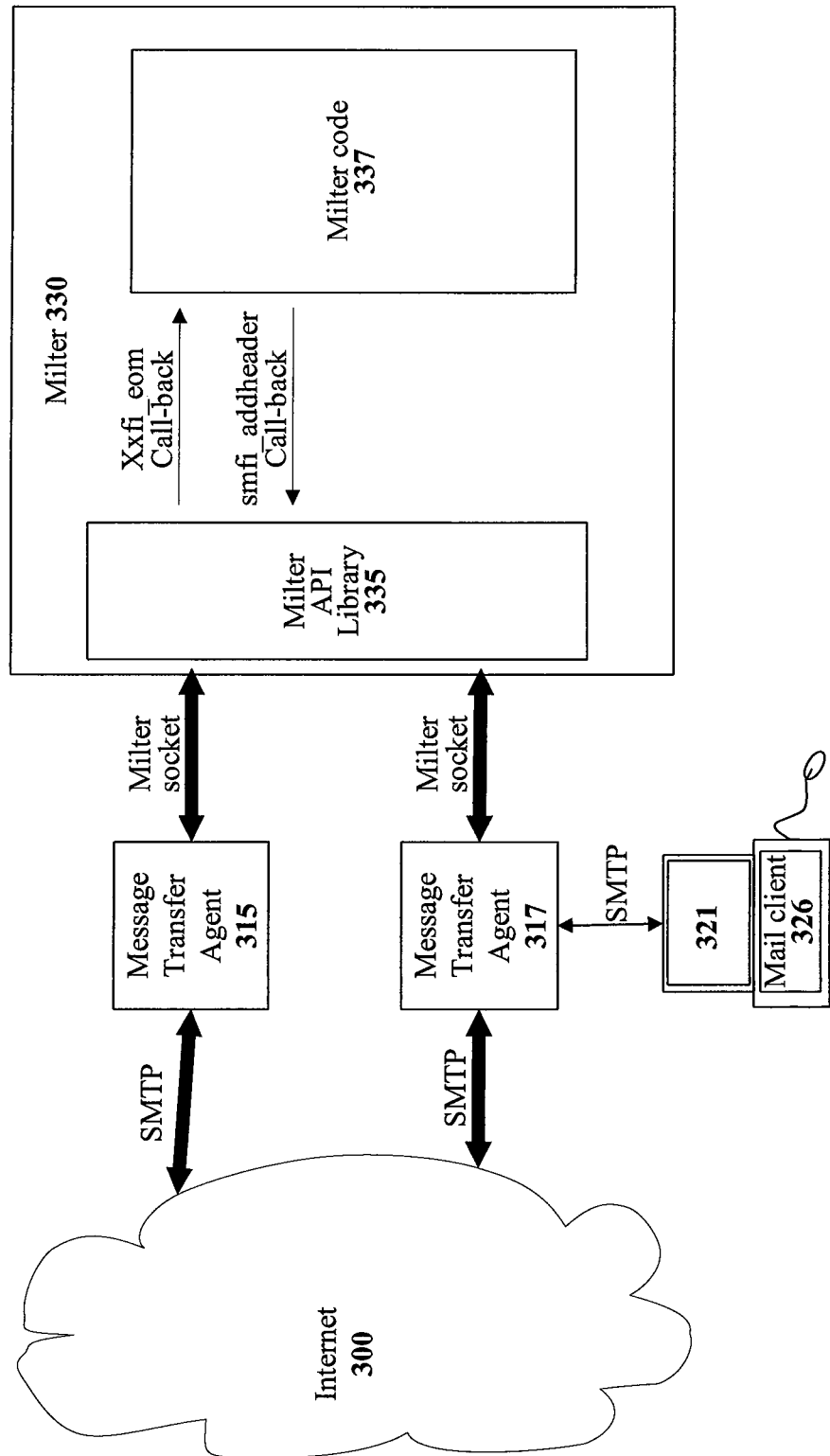
FIG. 3 illustrates a single mail filter (milter) that processes email messages from two different message transfer agents.

Libmilter provides a communication protocol for communicating with the MTA. The milter library accepts connections from one or more MTAs and passes relevant data to mail filter routines through a set of call-backs that are registered with the milter library. The call-back routines process email messages and make appropriate responses based on return codes. A mail filter program may also send data back to the MTA using a set of defined library calls. FIG. 3 illustrates a single mail filter 330 that processes email messages from two different MTAs (315 and 317).

As illustrated in FIG. 3, each MTA (315 and 317) communicates with other MTAs and mail client programs (such as mail client 326) using the Simple Mail Transport Protocol (SMTP). An MTA configuration file for each MTA (315 and 317) specifies which filters are to be applied, and in what order, allowing an MTA administrator to combine multiple independently-developed mail filters as illustrated in FIG. 3. When a MTA receives a connection from an entity sending an email message, the MTA will communicate across a milter socket to a milter 330. The MTA communicates with a milter library 335 in the milter 330, passing information about the email message to the milter library 335.

Upon receiving email message information, the milter library 335 then makes call-backs into the milter routines that have registered for processing email messages. For example, in FIG. 3, the milter library 335 makes a xxfi_eom call-back into the milter code 337 to have the milter process an email message after the end of the email message has been received. As previously set forth, a milter may reject a connection, discard an email message, or make changes to email messages that the milter receives. For example, as illustrated in FIG. 3, milter code 337 is making a smfi_addheader call-back into the milter API library 335 to add another SMTP email header onto an email message. Changed email messages are returned by the milter library 335 back to the MTA such that the MTA may proceed to route the changed email message as appropriate.

The architecture of the email filter system wherein email filters run as a separate process outside of the main Message Transfer Agent program provides several convenient advantages that should be mentioned:

- As an external process, a milter does not require "root" permissions and thus avoids many potential security problems.
- Any failure of a milter process will not affect the main MTA nor any other milter such that problems with a particular milter will be isolated to that particular milter.
- By using an external process, each milter can potentially have higher performance because of the parallelism inherent in multiple processes.
- Milters can be quickly and easily added to or removed from a mail system.
- Milters may be remote from the MTA being served.

Email Authentication Pre-processing with Mail Filters

One embodiment of the multi-stage email processing system proposes using mail filters (milters) for performing upstream email processing for tasks like email authentication that are normally fully performed within an end user email client program. Full email authentication may be performed upstream or a subset of processing steps may be performed. This section will disclose an embodiment of the multi-stage email processing system that performs limited pre-processing for email authentication using a mail filter (milter).

Figure 4:
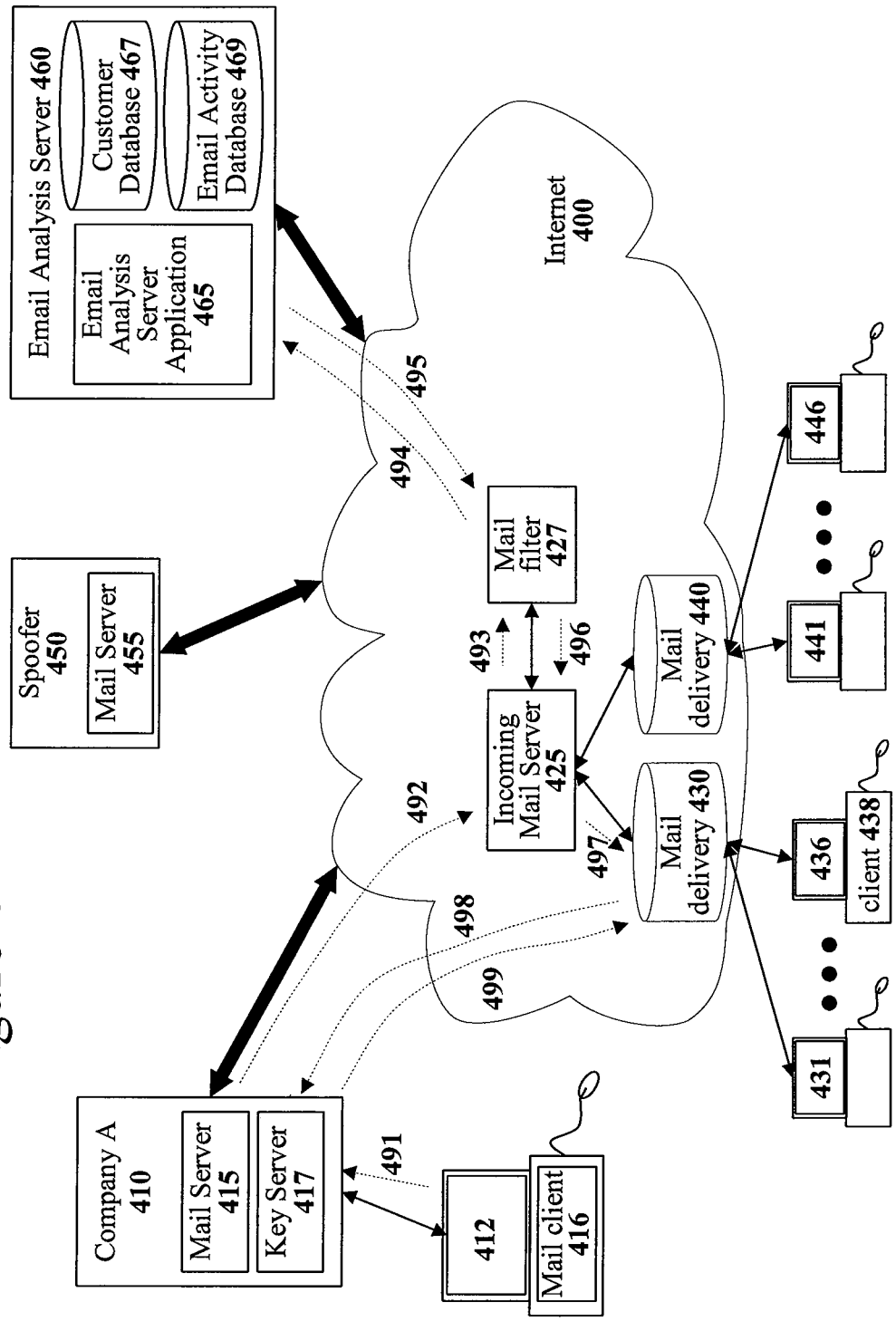
FIG. 4 illustrates a conceptual diagram that shows how a mail filter can be used to perform email authentication pre-processing.

Referring to FIG. 4 a conceptual diagram for a mail authentication system that performs email authentication using the multi-stage email processing is disclosed. To describe the operation of the email authentication system, an example will be disclosed following an email message from sender to recipient with reference to FIG. 4.

Initially a mail sender at computer system 412 uses a mail client program 416 to compose and send an email message addressed for delivery to an end user of computer system 436. Any type of email client program may be used. The mail client program 416 passes the composed email message to the mail server 415 that has been assigned to handle out-going email for mail client program 416.

Mail server 415 then parses the header information in the email message to determine where to send the email message. After parsing the internet email headers, mail server 415 then delivers the email message along data path 492 to incoming mail server 425 that is designated to receive email for the intended email recipient at computer system 436. In the example of FIG. 4, computer system 436 uses a mail server provided by his local Internet Service Provider (ISP) such that incoming email server 425 is illustrated as part of the Internet from the perspective of computer system 436.

Incoming mail server 425 is a mail server that performs mail authentication pre-processing with a mail filter (milter) according to the teachings of the present disclosure. Thus, when incoming mail server 425 receives the email message from mail server 415, incoming mail server 425 passes information about the received email message along data path 493 to mail filter 427 for mail authentication some pre-processing.

Mail filter 427 examines the information received from incoming mail server 425 to determine how to process the email message. In one embodiment, a first decision to be made is to determine what type of email authentication processing is required. This may be performed by having mail filter 427 contact an email analysis server application 465 along data path 494 with information about the email message and requesting how the email message should be processed (or if the email message should be processed at all). The information about the email message may consist of information from the "From:" field, the "Return-Path:" field, and any other email field that designates a source of the email message. In one embodiment, the communication between mail filter 427 and email analysis server application 465 is encrypted for privacy and security reasons.

Upon receiving a request as to how a particular email message should be authenticated, email analysis server application 465 may consult a customer database 467 to determine if the email message was sent by customer that has requested that their email messages should be authenticated in a special manner. Email analysis server application 465 may inform mail filter 427 along return data path 495 with any special information that specifies how the email message should be authenticated. In one embodiment, the mail filter program 427 builds up a cache of information received from the email analysis server application 465 that can be indexed using an email address. In this manner, the mail filter program 427 can reduce the amount of accesses to the email analysis server application 465. However, the cache should not be kept permanently since the information may change over time. This may be performed by placing a timestamp on each cache entry and specifying that a cache entry expire after specified amount of time (such as a few hours).

The email analysis server application 465 may specify how an email message should be authenticated by providing instructions and data along data path 495 that helps the mail filter 427 perform authentication pre-processing. For example, in one embodiment, the email analysis server application 465 may provide special instructions and data that specify how the email message should be handled after email authentication. For example, an instruction may specify that messages that fail authentication be deleted or placed into a quarantine folder. These instructions and data may further include display directives that describe how the results of an email authentication should be presented on the user's display screen. Display directives may include specific images (or pointers to such images) or text that should be displayed after final authentication decision. In one embodiment, the mail filter 427 deems the received instructions and data as email authentication pre-processing information that is placed into a new internet email header that is inserted into the email message.

Request For Comments (RFC) document 2822 covering the format of internet email headers allows for custom headers to be inserted into any internet email messages. These custom headers, commonly called X-headers because these custom headers all begin with the prefix "X-", may be used by any email processing application for its own proprietary purpose. In a mail filter embodiment, the mail filter 427 may perform a smfi_addheadero call-back into the milter API library in order to add another SMTP email header onto the email message currently being processed.

The format of the instructions and data placed into the newly added internet email header may take many different forms as long as it conforms to the rules for SMTP email headers. For example, in one embodiment, the commonly used XML-based SOAP message format may be used. In another embodiment, a JavaScript Object Notation (JSON) may be used. The overall objective for the added internet header is to add instructions and data into the internet email message that may be extracted and used by a later email application that receives the email message later in the delivery chain. For example, an end user email client program may extract and use the instructions and data that were placed into an internet email header.

In one particular embodiment, simple key and value pairs are used to carry information generated by the authentication pre-processing steps and placed into an internet email message X-header. The X Header will consist of one or more key value pairs enclosed in brackets. The key and value pairs may be placed in order of priority. Thus, if there is any conflict between the instructions, the earliest instruction should take precedence. If the X-header line exceeds 998 characters the X-header line may be split '\n' (0x0A) and a space. The following Table 1 provides an example of instructions and data that may be placed into an internet header by the mail filter 427 in one particular embodiment that performs limited authentication pre-processing.

TABLE 1

Authentication Pre-Processing Information

| Key | Data Type | Values | Meaning [I guessed at these, please fix] |
|---|---|---|---|
| AccountID | String | | Customer account identifier. |
| EmailAddress | String | | The Email Address that sent the email message. |
| AccountClass | enum | {BUDDY = 0, TRUEMARK = 1} | Type of customer account. |
| ProfileURI | String | | The internet address of certificate to display. |
| ProfileDisplaySize | String | | Size of the certificate (in pixels) to display with this email message. |
| IconURI | String | | The internet address of icon that may be displayed with this email message. |
| OnAuthFail | enum | TRUEMARK = 0, NO_TRUEMARK = 1, SPOOF = 2 | An instruction that specifies an email client program as to what action should be taken if email authentication fails. |
| RelationShip | enum | NO_BUDDY = 0, BUDDY = 1, YDDUB = 2, MUTUAL_BUDDY = 3 | Nature of relationship with the email sender. |
| DisplayNameAction | enum | REMOVE = 0, REPLACE = 1, IGNORE = 2 | An instruction that specifies to the email client program how it should display the name of customer in the From: field. |
| DisplayName | String | | A text string that may be displayed depending on the authentication results and the contents of the above OnAuthFail and DisplayNameAction fields. |

In the preceding table, the 'OnAuthFail' field contains an instruction that specifies how the end user's email client should display (or otherwise handle) the email message after an authentication has failed. When combined with the 'DisplayNameAction' field these instructions may specify that the current address in the "From:" field be completely removed. These instructions may specify that the string in the later DisplayName field be used instead of the current address. These instructions could specify that the email client program should delete the email message, move the email message to special quarantine folder, or otherwise handle the email message in a special manner. These instructions could also specify that nothing special should be done.

For privacy and security concerns, the instructions and data information placed into the email header may be encrypted. Specifically, privacy is protected since unauthorized entities will not be able to make any sense of the encrypted instructions and data. Security is protected since the encrypted instructions and data cannot be tampered with by an unauthorized entity. Any attempt at tampering with the encrypted instructions and data placed into an email message header would not decrypt properly such that the later email program would know the email message had been tampered with. A possible example of how an encrypted internet email header may appear is presented as follows:

X-IconixID:[store-news@example_company.com:=123
1231212345243534567474634523453457645674674574
6745678567856785678567967896789
4456721349872379823409587908723409570987209387409875098709870923570987098237400
95870987098709872349857098709827364098570987234
5098709234576987029347509870923
4570987234509870987092385709872345908709238570987098374509870923570987092387098720934857
0987092385708234509870923857082345]

Note that no significant information can be gained from that header. However, after decrypting, the key-value pairs of the preceding encrypted internet header may appear as follows:

[AccountId:=777]
[EmailAddress:=store-news@example_company.com]
[AccountClass:=1]
[ProfileURI:=https://S0.email_analysis_company.com/profile/mark.php?email=store-news@example_company.com&profile=777]
[ProfileDisplaySize:=6]
[IconURI:=https://S0.email_analysis_company.com/images/mark/777/image.gif]
[OnAuthFail:=1]
[DisplayNameAction:=2]

This decrypted set of instructions and data can be used by a later program in the email processing chain such as a subsequent message transfer agent or an end user's email client program.

Referring back to FIG. 4, once the mail filter 427 has added the X-header with the instructions and data, the mail filter 427 may return control of the altered email message along data path 496 to the incoming mail server 425. Incoming mail server 425 may then pass the email message along data path 497 to mail delivery server 430. Mail delivery server 430 would eventually deliver the email message to the intended email recipient using a mail client program 438 within computer system 436.

Mail delivery server 430 will typically hold the email message until the mail client program 438 in recipient computer system 436 requests the email message. When the mail client program 438 eventually requests the email message, mail delivery server 430 may then perform additional email authentication processing. To guide the additional email authentication processing performed by mail delivery server 430, mail delivery server 430 may decrypt and decode that mail header added by the mail filter 427 that contains instructions and data that set forth how the email message should be authenticated.

If the email message was sent using the Domain Keys Identified Mail (DKIM) Signatures system for email authentication as set forth in RFC 4871 then mail delivery server 430 may perform the steps necessary to authenticate DKIM email messages. Specifically, mail delivery server 430 may contact the sender's domain key server 417 along data path 498 to obtain a key for that domain. Mail delivery server 430 will receive the private key associated with the domain of the sender along path 499 and attempt to decrypt the DKIM signature on the message.

If the cryptographic signature decrypts properly (as will occur with a real message from Company A containing a cryptographic signature from Company A's domain) then mail delivery server 430 may mark the email message as authentic. This may be performed by additional information to the previously created email header in the email message. If the cryptographic signature does not decrypt properly or there is no cryptographic signature (as may be the case for email send from spoofer 450), then mail delivery server 430 may perform an action that was specified to be performed by the instructions and data that were placed by mail filter 427 into the email header. Alternatively, mail delivery server 430 may simply indicate the email authentication failure in that email header or in another manner. After completing its authentication steps, the mail delivery server 430 may pass the email message to the mail client program 438 within computer system 436.

When the mail client program 438 finally receives the message, that mail client program 438, may perform some simple final steps associated with the email authentication. For example, the email client program 438 may perform the step of actually displaying any icons or messages associated with authentication success or authentication failure as set forth with the example set of instructions and data disclosed in Table 1 that may be placed into an internet header by the mail filter 427.

In one embodiment, the program that actually performs the very final email authentication processing (such as the display of the email authentication results on the display screen) may consist of or comprise in part a simple light-weight application program such as a JavaScript program or ActiveX program. In this manner, the very final mail client program 438 that performs processing on the email message can be downloaded from mail delivery server 430 to the recipient computer system 436. In this manner, no dedicated email client program needed to be installed on recipient computer system 436, yet the recipient computer system 436 would be performing just as if it contained a sophisticated email client program that could perform its own authentication of email messages.

In addition to simply displaying the authenticated or non-authenticated email message properly, the email client program 438 can be used to report various events that occur with the email message back to email analysis server application 465. In one embodiment, the email client program 438 may report the various email message events presented in the following table to the email analysis server application 465 when these various email message events occur

TABLE 2

Possible Email Events To Report
Email Events

Email marked as authenticated in a list view of email messages.
Email marked as authenticated in a message pre-view view of the email message.
Email marked as authenticated in an individual message viewing
Email marked as phishing (not authenticated) in a list view of email messages.

TABLE 2-continued

Possible Email Events To Report
Email Events

Email marked as phishing (not authenticated) in a pre-view view of the message.
Email marked as phishing (not authenticated) in an individual message viewing
Email not marked and not authenticated in a list view of email messages
Email not marked and not authenticated in a pre-view view of the email message
Email not marked and not authenticated in an individual message viewing.
Email Client Program installed, uninstalled, updated, etc.
Any other even associated with the email message detectable by email client.

The email client program 438 may report the email message events set forth in Table 2 (and other events) using a web services interface to the email analysis server application 465. When reporting the email message events to the email analysis server application 465, the email client program 438 would generally include identification information that can be used to identify the specific email message associated with the event. This identification information may include the email address of the sender, the email address of the recipient, and a message identifier.

Note that the multi-stage email processing example set forth with reference to FIG. 4 disclosed a system wherein email authentication processing occurred at three different stages along the email message's delivery chain. Specifically, some email authentication pre-processing was first performed by milter 427, formal email message authentication processing was performed by mail delivery server 430, and the actual display of the email authentication results was performed by email client program 438. However, other embodiments can divide the workload in different manners. In one alternate embodiment, the mail delivery server 430 does not perform any email authentication processing or doesn't even exist along the email processing chain such that the end user email client program may perform the formal email message authentication. The following section discloses yet another alternate embodiment wherein the mail filter is used to perform the entire formal authentication of an email message and the end user email client program only performs specific actions related to the display of the email authentication results.

Full Email Authentication Processing with a Mail Filter

Figure 5:
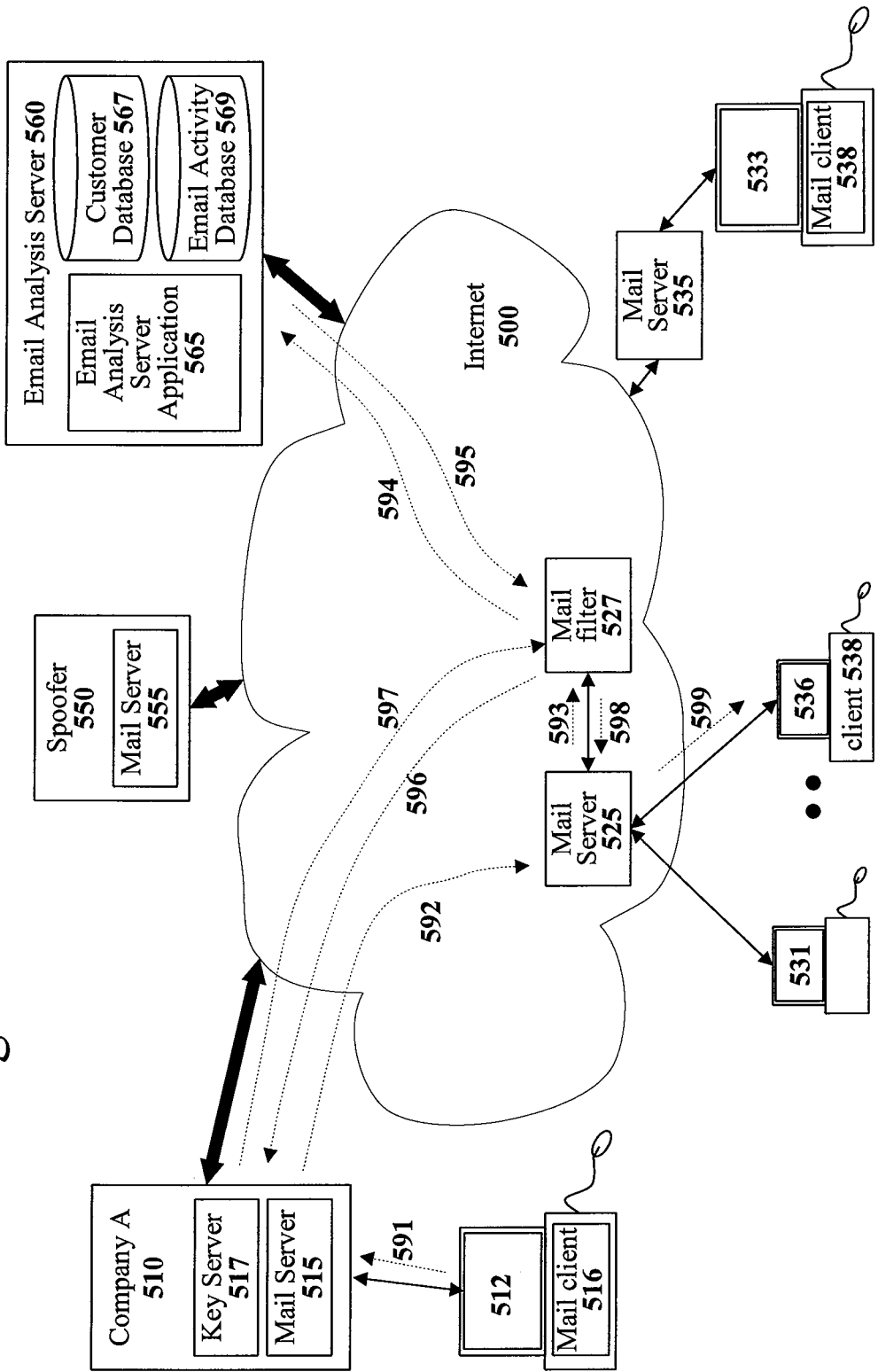
FIG. 5 illustrates a conceptual diagram that shows how a mail filter can be used to perform full email authentication processing.

FIG. 5 illustrates a conceptual diagram for multi-stage email processing system that performs full email authentication processing using a mail filter and uses an email client program for displaying the results of that email authentication. To describe the operation of the email authentication system, a full example of an email message sent from an email sender to the email recipient will be disclosed with reference to FIG. 5.

Initially an email sender at computer system 512 composes and sends an email message addressed to a user of computer system 536 using mail client program 516. Mail client program 516 passes the composed email message to its local assigned mail server 515 that has been assigned to handle out-going email for mail client program 516. Mail server 515 parses the header information in the email message and then determines that it will send the email message along data path 592 to mail server 525 that has been designated to receive email messages for the intended email message recipient at computer system 536.

Mail server 525 is a mail server that performs email authentication processing with an associated mail filter (milter) 527 according to the teachings of the present disclosure. Thus, when incoming mail server 525 receives the email message from mail server 515, mail server 525 passes information about the received email message along data path 593 to mail filter 527 for email authentication processing.

Mail filter 527 examines the information received from mail server 525 to determine how to process the email message. As set forth in the previous embodiment, mail filter 527 may contact an email analysis server application 565 along data path 594 with information about the email message to obtain additional information on whether to authenticate the message and how to process the email message for authentication. In one embodiment, the communication between mail filter 527 and email analysis server application 565 is encrypted for privacy and security reasons. Upon receiving a request as to how a particular email message should be authenticated, email analysis server application 565 may consult a customer database 567 to determine if the email message was sent by customer that has requested that their email messages should be authenticated in a particular manner. Email analysis server application 565 may inform mail filter 527 along return data path 595 whether the email message should be authenticated and how to authenticate the email message.

The email analysis server application 565 may provide instructions and data along data path 595 that specify how the mail filter 527 should perform email authentication. And, as set forth in the previous embodiment, email analysis server application 565 may provide information that specifies how the email message should be handled after a final authentication decision has been made. This information may include information on how the email authentication results should be displayed to an end user.

Mail filter 527 may then perform email authentication using one of several different email authentication techniques. Fore example, if the email message was sent using the Domain Keys Identified Mail (DKIM) Signatures system for email authentication as set forth in RFC 4871 then mail filter 527 may perform the steps necessary to authenticate DKIM email messages. Thus, mail filter 527 may contact a domain key server 517 associated with the domain of the sender along data path 596 to obtain a key for that domain. Mail filter 527 will receive the private key associated with the domain of the sender along path 597 and attempt to decrypt the DKIM signature on the message.

If the cryptographic signature decrypts properly (as will occur with a real message from Company A containing a cryptographic signature from Company A's domain) then mail filter 527 may mark the email message as authentic. Mail filter 527 may mark the message as authenticated by performing a smfi_addheadero call-back into the milter API library to add another SMTP email header onto the email message and specifying the new email header to indicate the email message has been authenticated by mail filter 527. In addition, the mail filter 527 may add the instructions and data that received from email analysis server application 565 that set forth how the authenticated email message should be displayed to the end user.

If the cryptographic signature does not decrypt properly or there is no cryptographic signature (as may be the case for email send from spoofer 550), then mail filter 527 may perform some action specified by email analysis server application 565 to be performed upon authentication failure. For example, email filter 527 could discard email messages that do not authenticate properly. Alternatively, the mail filter 527 may just add an email header onto the email message specifying that the message failed to authenticate and include the instructions and data that received from email analysis server application 565 that set forth how non-authenticated email message should be displayed to the end user.

The authenticated or non-authenticated message will then be given to back to mail server 525. Mail server 525 will eventually deliver to the recipient computer system 536, likely upon request from mail client program 538.

When the mail client program 538 finally receives the message, that mail client program 538, may perform some simple final steps associated with the email authentication. As set forth in the previous embodiment, the email client program 538 may extract the instructions and data from the new mail header and use those instructions and data to control how the authenticated or non-authenticated email message is displayed to the end user. For example, the email client program 538 may display any icons or messages associated with email authentication success or email authentication failure as set forth in the example set of instructions and data disclosed in Table 1.

In one embodiment, the email client program 538 that actually performs the very final email authentication processing (such as the display of the email authentication results on the display screen) may consist of or comprise in part a simple light-weight application such as a JavaScript program or ActiveX program. In this manner, the very final mail client program 538 that performs processing on the email message can be, fully or in-part, downloaded from mail server 525 to the recipient computer system 536. In this manner, no dedicated email client program needed to be installed on recipient computer system 536, yet the recipient computer system 536 would be performing just as if it contained a sophisticated email client program that could perform its own authentication of email messages.

In addition to displaying the results of the authentication performed by mail filter 525, email client program 538 can be used to report various events that occur to the email message back to email analysis server application 465. For example, email client program 538 may report the events set forth in Table 2.

Alternate Embodiments

The disclosure has largely been described with reference to an embodiment that uses a mail filter (milter) for upstream email processing. However, this is just one possible embodiment. Various different alternate embodiments exist. For example, the upstream processing could be fully integrated within a mail transfer agent system.

In a network environment that uses Microsoft Exchange Servers as Message Transfer Agents (MTAs), there is currently no standard milter interface available. However, there are other methods of achieving the desired result. For example, with Exchange Server 2003, a third-party program can register with an Exchange Server as an event sink. As a registered event sink, the third-party program will be activated by Exchange Server upon the occurrence of specific even and be given access to incoming or outgoing messages. Exchange Server 2007 replaced the concept of even sinks with Transport agents. When an email message arrives in an Exchange Server 2007 system, the email message is moved through an SMTP transport pipeline SMTP and each SMTP Event may have Transport agents that access email messages during this process and may perform some actions. The following table lists the SMTP Events its sequence and what kind of SMTP verb or operation verb is used in each one.

TABLE 1

Authentication Pre-Processing Information

| Sequence | SMTP event | Occurs when . . . |
|---|---|---|
| 1 | OnConnectEvent | An initial connection occurs from a remote SMTP host. |
| 2 | OnHeloCommand | the HELO SMTP verb is issued |
| 3 | OnEhloCommand | the EHLO SMTP verb is issued |
| 4 | OnAuthCommand | the AUTH SMTP verb is issued |
| 5 | OnEndOfAuthentication | The complete authentication was completed |
| 6 | OnMailCommand | the MAIL FROM SMTP verb is issued |
| 7 | OnRcptCommand | the RCPT TO SMTP verb is issued |
| 8 | OnDataCommand | the DATA SMTP verb is issued |
| 9 | OnEndOfHeaders | The message headers were completely submitted |
| 10 | OnEndOfData | The remote SMTP host issues <CRLF>.<CRLF>, which indicates the end of data. |
| ** | OnHelpCommand | The HELP SMTP verb may be issued at any time after the OnConnectEvent SMTP event and before the OnDisconnectEvent SMTP event. |
| ** | OnNoopCommand | The NOOP SMTP verb may be issued at any time after the OnConnectEvent SMTP event and before the OnDisconnectEvent SMTP event. |
| ** | OnReject | The receiving SMTP host issues a status notification (DSN) code to the sending SMTP host. This event can occur at any time after the OnConnectEvent SMTP event and before the OnDisconnectEvent SMTP event. |
| ** | OnRsetCommand | This event is triggered when the RSET SMTP verb is issued by the sending SMTP host. This event can occur at any time after the OnConnectEvent SMTP event and before the OnDisconnectEvent SMTP event. |
| 11 | OnDisconnectEvent | This event is triggered upon disconnection of the SMTP conversation by either a receiving or sending SMTP host. |
| 12 | OnSubmittedMessage | This event is triggered upon submission of a message into the Submission queues on the receiving SMTP host. All messages encounter this event whether they arrived via SMTP submission, MAPI submission, or the Pickup or Replay directories. |
| 13 | OnRoutedMessage | After messages have been categorized, distribution lists have been expanded, and recipients have been resolved. |

The teachings of the present invention can be implemented as transport agents that handle some of these SMTP events.

The preceding description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:
1. A method, comprising:
receiving, by a message client, a message from a sender;
obtaining, by the message client, an existing header from the message;
obtaining, by the message client, a second header from the message;
identifying, by the message client, executable code from the second header, wherein identifying further includes:
identifying the executable code as name value pairs, each name value pair comprises a key and a value for the corresponding key; and
identifying the keys of the name value pairs as an account identifier, a sender message address key for the sender, a type of account key, an internet address to a certificate for a domain key associated with the corresponding value of the sender message address, a size in pixels key for the certificate, an icon address key for an icon that is to be displayed with the message, an on failure action key, a relationship key between the sender and a recipient of the message, and a display name action key that instructs on the failure that the corresponding value representing the text string be displayed in the from field of the message;

authenticating, by the message client, the sender of the message; and processing, by the message client, the executable code upon a failure of the authenticating causing a sender address provided in a from field of the message to be replaced with a text string describing the failure for the authenticating.

2. The method of claim 1 further comprising, processing the executable code upon the failure causing the icon to be retrieved from the icon addresses provided as data with the executable code and displaying the icon when displaying the message.

3. The method of claim 1 further comprising, processing the executable code upon the failure causing the message to be moved to a quarantine folder.

4. The method of claim 1, wherein identifying further includes obtaining an encrypted version of the executable code from the second header and decrypting the encrypted version obtaining the executable code.

5. The method of claim 1, wherein authenticating further includes obtaining the domain key from a domain identified in a senders message address for the sender and using the domain key to verify that a certificate of the message as a domain signature associated with the domain.

6. The method of claim 1, wherein authenticating further includes identifying data that accompanies the executable code in the second header, wherein the data comprises an authentication result value indicating whether authentication of the message was already performed and whether the authentication was successful or the failure.

7. The method of claim 1, wherein processing further includes processing the executable code causing events associated with viewing modes of the message viewed by the recipient of the message to be reported to a message server as each viewing mode is viewed by the recipient.

8. The method of claim 7, wherein processing further includes processing the executable code causing the events to be reported to the message server for the viewing modes that comprise, a list view when the message was authenticated, a message pre-view view when the message was authenticated, an individual message view when the message was authenticated, a phishing list view when the authenticating was associated with the failure, a phishing pre-view view when the authenticating was associated with the failure, and a phishing individual message view when the authenticating was associated with the failure.

9. The method of claim 2, wherein processing further includes processing the executable code causing an event to be reported to a message server when a client program associated with a recipient device for receiving and viewing the message was installed, uninstalled, or updated.

10. A method, comprising:

receiving, by a message server, a message sent from a sender and directed to a recipient associated with a message client of the message server;

formulating, by the message server, executable instructions for authenticating the sender of the message and for custom identifying and displaying results of the authenticating within the message client, wherein formulating further includes:

adding within the executable instructions name value pairs, each name value pair comprises a key and a value for the corresponding key; and adding within the executable instructions the keys of the name value pairs as an account identifier, a sender message address key for the sender, a type of account key, an internet address to a certificate for a domain key associated with the corresponding value of the sender message address, a size in pixels key for the certificate, an icon address key for an icon that is to be displayed with the message, an on failure action key, a relationship key between the sender and the recipient of the message, and a display name action key that instructs on the failure that the corresponding value representing the text string be displayed in the from field of the message;

adding, by the message server, the executable instructions as a new header to the message that is separate from an existing header of the message; and providing, by the message server, the message with the existing header and the new header to a next processing entity associated with delivering the message to a recipient device for viewing by the recipient, each processing entity processing at least a portion of the executable instructions when receiving the message.

11. The method of claim 10, wherein formulating further includes providing the key and value pairs, wherein results from processing of the corresponding portion of the executable instructions by each processing entity are updated in the corresponding values of the corresponding key and value pairs before the message is delivered to a next processing entity.

12. The method of claim 10, wherein formulating further includes obtaining the internet address for the domain key associated with a domain of a sender address for the sender of the message and including the address as parameter data to the executable instructions.

13. The method of claim 10, wherein formulating further includes formulating the executable instructions as a lightweight script.

14. The method of claim 10, wherein formulating further includes processing a first portion of the authenticating and providing results associated with the first portion as data associated with the executable instructions for identification by the processing entities.

15. The method of claim 10, wherein adding further includes providing a special character to separate a first portion of the executable instructions from a second portion of the executable instructions within the new header when the executable instructions exceed a predefined size limit for the new header and providing the second portion in an extended header.

16. The method of claim 10 further comprising, capturing events from the processing entities as the processing entities process their corresponding portion of the executable instructions and as the recipient views the message in different view modes on the recipient device.

17. A system, comprising:

a server comprising a processor and a non-transitory computer-readable storage medium;

the non-transitory computer-readable storage medium comprising executable instructions; and the executable instructions when executed by the processor from the non-transitory computer-readable storage medium cause the processor to perform operations comprising:

receiving a message sent from a sender and directed to a recipient associated with a message client of the server;

formulating executable instructions for authenticating the sender of the message and for custom identifying and displaying results of the authenticating within the message client, wherein formulating further includes:
  adding within the executable instructions name value pairs, each name value pair comprises a key and a value for the corresponding key; and
  adding within the executable instructions the keys of the name value pairs as an account identifier, a sender message address key for the sender, a type of account key, an internet address to a certificate for a domain key associated with the corresponding value of the sender message address, a size in pixels key for the certificate, an icon address key for an icon that is to be displayed with the message, an on failure action key, a relationship key between the sender and the recipient of the message, and a display name action key that instructs on the failure that the corresponding value representing the text string be displayed in the from field of the message;
  adding the executable instructions as a new header to the message that is separate from an existing header of the message; and
  providing the message with the existing header and the new header to a next processing entity associated with delivering the message to a recipient device for viewing by the recipient, each processing entity processing at least a portion of the executable instructions when receiving the message.

18. The system of claim 17, wherein the server is an email server associated with a recipient domain of the recipient and the message is an email sent from a sender domain of the sender to the recipient through the recipient domain.

* * * * *

UNITED STATES PATENT AND TRADEMARK OFFICE
CERTIFICATE OF CORRECTION

PATENT NO. : 11,271,883 B2  
APPLICATION NO. : 16/987862  
DATED : March 8, 2022  
INVENTOR(S) : Sachtjen et al.

Page 1 of 1

It is certified that error appears in the above-identified patent and that said Letters Patent is hereby corrected as shown below:

In the Claims

In Column 19, Line 51, in Claim 9, delete "claim 2," and insert --claim 1,-- therefor Signed and Sealed this
Fifth Day of July, 2022

Katherine Kelly Vidal
*Director of the United States Patent and Trademark Office*